United States Patent
Woo

(10) Patent No.: US 10,681,628 B2
(45) Date of Patent: Jun. 9, 2020

(54) METHOD AND APPARATUS FOR SCANNING ACCESS POINTS IN A PORTABLE TERMINAL

(71) Applicant: Samsung Electronics Co., Ltd., Gyeonggi-do (KR)

(72) Inventor: Yong-Ha Woo, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/012,964

(22) Filed: Jun. 20, 2018

(65) Prior Publication Data

US 2018/0302860 A1 Oct. 18, 2018

Related U.S. Application Data

(63) Continuation of application No. 13/660,378, filed on Oct. 25, 2012, now abandoned.

(30) Foreign Application Priority Data

Oct. 26, 2011 (KR) .................. 10-2011-0109830

(51) Int. Cl.
*H04W 48/20* (2009.01)
*H04W 52/02* (2009.01)
*H04W 84/12* (2009.01)

(52) U.S. Cl.
CPC ....... *H04W 48/20* (2013.01); *H04W 52/0254* (2013.01); *H04W 84/12* (2013.01); *Y02D 70/1242* (2018.01); *Y02D 70/142* (2018.01); *Y02D 70/144* (2018.01); *Y02D 70/146* (2018.01)

(58) Field of Classification Search
CPC .................. H04W 52/0254; H04W 48/20
See application file for complete search history.

(56) References Cited

U.S. PATENT DOCUMENTS

| | | | |
|---|---|---|---|
| 2004/0176024 A1* | 9/2004 | Hsu | H04L 12/189 455/3.04 |
| 2005/0105501 A1 | 5/2005 | Oura | |
| 2006/0128382 A1* | 6/2006 | Kim | G06K 15/00 455/434 |
| 2008/0014934 A1 | 1/2008 | Balasubramanian et al. | |
| 2008/0181187 A1 | 7/2008 | Scott et al. | |
| 2008/0250122 A1 | 10/2008 | Zsigmond et al. | |
| 2009/0103503 A1 | 4/2009 | Chhabra | |
| 2010/0080134 A1 | 4/2010 | Maniatopoulos et al. | |
| 2010/0177673 A1 | 7/2010 | Yoon | |
| 2010/0303051 A1 | 12/2010 | Umeuchi et al. | |
| 2011/0075598 A1 | 3/2011 | Jalfon et al. | |
| 2011/0111708 A1 | 5/2011 | Tu et al. | |
| 2011/0158143 A1 | 6/2011 | Yun et al. | |
| 2011/0273998 A1 | 11/2011 | Mudrick et al. | |
| 2012/0190339 A1 | 7/2012 | Abe et al. | |
| 2013/0082974 A1 | 4/2013 | Kerr et al. | |

FOREIGN PATENT DOCUMENTS

KR  10-2009-0039776 A  4/2009

* cited by examiner

*Primary Examiner* — Gary Mui
(74) *Attorney, Agent, or Firm* — Cha & Reiter, LLC

(57) ABSTRACT

A method for scanning an Access Point (AP) in a portable terminal includes determining whether a request to activate the portable terminal is detected; and upon detecting the request, immediately and additionally scanning an AP independently of a predetermined scan cycle.

11 Claims, 2 Drawing Sheets

METHOD AND APPARATUS FOR SCANNING ACCESS POINTS IN A PORTABLE TERMINAL

CLAIM OF PRIORITY

This application is a Continuation of U.S. patent application Ser. No. 13/660,378 filed on Oct. 25, 2012 which claims the benefit under 35 U.S.C. § 119(a) of a Korean Patent Application filed in the Korean Intellectual Property Office on Oct. 26, 2011 and assigned Serial No. 10-2011-0109830, the entire disclosure of which is hereby incorporated by reference.

BACKGROUND

Field of the Invention

The present invention relates generally to a portable terminal, and more particularly, to a method and apparatus for enabling short-range wireless communication by scanning Access Points (APs) while reducing the battery consumption.

Description of the Related Art

Recently, the use of portable terminals such as smart phones has become commonplace as they provide a variety of useful features to users.

One useful feature provided by the portable terminals is a short-range wireless communication function such as Wireless Fidelity (Wi-Fi) and WiBro (or Mobile WiMax). With this feature, users may conveniently enjoy wireless communication using the short-range wireless communication capability.

The short-range wireless communication function refers to a function in which a portable terminal scans its surrounding APs and accesses a specific AP according to the scan outcome. However, if the portable terminal continuously scans APs for its access to a particular AP, its battery consumption may increase undesirably.

Conventional technology for performing AP scan at a predetermined time period was proposed in order to efficiently manage the battery consumption of portable terminals due drain by the AP scan operation. In this technology, a decrease in scan cycle may enable a rapid access to AP but causes an increase in battery consumption, and an increase in scan cycle may contribute to a reduction in battery consumption but causes a delay in AP access.

For example, the conventional back-off algorithm proposes a method of gradually increasing a scan cycle for AP access. The gradual increase in the scan interval within a specific time may contribute to a reduction in power consumption, but an increase in the scan interval beyond a specific time may cause a delay in AP access.

Therefore, there is a need for an AP scanning method and apparatus capable of rapidly accessing an AP upon request for the use of short-range wireless communication from a user, while minimizing the power consumption.

SUMMARY

An aspect of an exemplary embodiment of the present invention is to provide an AP scanning method and apparatus capable of rapidly accessing an AP upon request for the use of short-range wireless communication from a user, while minimizing the power consumption.

In accordance with one aspect of the present invention, a method for scanning an Access Point (AP) in a portable terminal includes determining whether a request for activating the portable terminal is detected; and upon detecting the request for activating the portable terminal, additionally and immediately scanning an AP independently of a predetermined scan cycle set by system settings of the portable terminal.

In accordance with another aspect of the present invention, an apparatus for scanning an Access Point (AP) in a portable terminal includes a key input unit for receiving a key input from a user; a short-range communication module for providing a short-range wireless communication function based on an IEEE 802.11 standard; a display for outputting various display information; and a controller for determining whether a request for activating the portable terminal is detected from the key input unit, and upon detecting the request for activating the portable terminal, additionally and immediately scanning an AP independently of a predetermined scan cycle set by system settings of the portable terminal.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION

Figure 1:
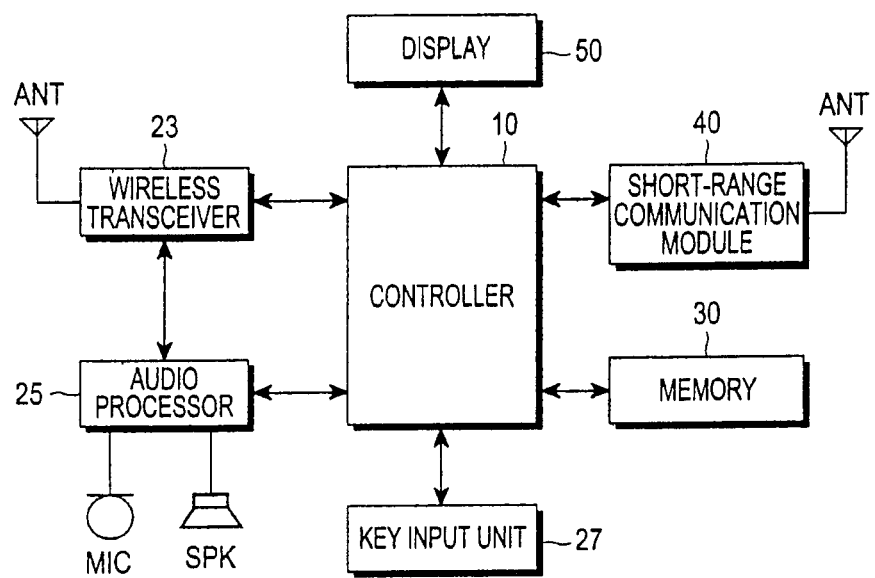
FIG. 1 is a block diagram of a portable terminal according to an embodiment of the present invention.

Exemplary embodiments of the present invention will now be described in detail with reference to the accompanying drawings. In the following description, specific details such as detailed configuration and components are merely provided to assist the overall understanding of exemplary embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

A portable terminal, to which an embodiment of the present invention is applicable, is a mobile electronic device that its user may easily carry with him or her, and may include video phones, cell phones, smart phones, International Mobile Telecommunication 2000 (IMT-2000) terminals, Wideband Code Division Multiple Access (WCDMA) terminals, Universal Mobile Telecommunication Service (UMTS) terminals, Personal Digital Assistants (PDAs), Portable Multimedia Players (PMPs), Digital Multimedia Broadcasting (DMB) terminals, E-book readers, portable computers (e.g., notebook computers), portable gaming devices (e.g., PlayStation Portable (PSP®)), tablet computers, and digital cameras.

Hereinafter, a portable terminal according to an embodiment of the present invention will be described below with reference to FIG. 1.

A wireless transceiver 23 includes a Radio Frequency (RF) unit and a modulator/demodulator (modem). The RF unit includes an RF transmitter for up-converting a frequency of transmission signals and amplifying the up-converted signals, and an RF receiver for low-noise-amplifying received signals and down-converting a frequency of the amplified signals. The modem includes a transmitter for coding and modulating transmission signals, and a receiver for demodulating and decoding signals received from the RF unit.

An audio processor 25 may constitute a coder/decoder (codec), which includes a data codec and an audio codec. The data codec processes data signals such as packet data, while the audio codec processes audio signals such as voice and multimedia files. The audio processor 25 converts digital audio signals received from the modem into analog audio signals by means of the audio codec, and plays the analog audio signals using a speaker SPK. The audio processor 25 converts analog audio signals picked up by a microphone MIC into digital audio signals by means of the audio codec, and transfers the digital audio signals to the modem. The codec may be provided separately, or may be included in a controller 10.

A key input unit 27 may include alphanumeric keys needed to input alphanumeric information and function keys needed to set various functions, or may include a touchpad or the like. When a display 50 has a capacitive or resistive touch screen, the key input unit 27 may include a minimum number of predetermined keys, and the display 50 may replace part of the key input function of the key input unit 27.

In accordance with an embodiment of the present invention, a user may request inactivation (e.g., turning off) of the activated display 50 and activation (e.g., turning on) of the deactivated display 50, using the key input unit 27.

A memory 30 may include a program memory and a data memory. The program memory stores programs for controlling the overall operation of the portable terminal. The memory 30 may further include external memories such as Compact Flash (CF), Secure Digital (SD), Micro Secure Digital (Micro-SD), Mini Secure Digital (Mini-SD), Extreme Digital (xD), and Memory Stick. The memory 30 may also include a disk such as Hard Disk Drive (HDD) and Solid State Disk (SSD).

A short-range communication module 40 provides a short-range wireless communication function such as Wireless Fidelity (Wi-Fi) and WiBro (or Mobile WiMax). For example, the short-range communication module 40 may access an AP and provide a short-range wireless communication function to the user in compliance with the IEEE 802.11 standard.

In accordance with an embodiment of the present invention, the short-range communication module 40 performs scan (e.g., active scan) at a predetermined period under control of the controller 10. During the scan operation, the short-range communication module 40 transmits a probe request signal for discovering APs around the portable terminal, and receives various information (e.g., information such as credential) needed for connection from APs in response to the probe request signal. The credential, which is the sum of cryptographic information, includes information such as authentication type, encryption type, network key, and ssid.

The display 50 may include Liquid Crystal Display (LCD) or Organic Light Emitting Diodes (OLED), which is classified into Passive Matrix (PMOLED) and Active Matrix (AMOLED), and outputs various display information generated in the portable terminal. The display 50 including a capacitive or resistive touch screen may serve as an input unit for controlling the portable terminal, together with the key input unit 27.

In accordance with an embodiment of the present invention, the display 50, which was inactivated (turned off) in standby mode, is activated (turned on) in response to a key input (e.g., a standby mode entry key) from the key input unit 27, and displays various display information. The display 50 may be a touch screen so that a user can input desired information or commands.

The controller 10 controls the overall operation of the portable terminal according to an embodiment of the present invention, and may switch and control an operation of the portable terminal depending on a user input received through the key input unit 27 or the display 50. In accordance with an embodiment of the present invention, the controller 10 additionally scans APs independently of a predetermined scan cycle upon detecting a request for activating the portable terminal, and if an AP is discovered, accesses the discovered AP.

Although the components that may be included in the portable terminal, such as a Bluetooth module, a camera module, an acceleration sensor, a proximity sensor, a geomagnetic sensor, and a Digital Media Broadcasting (DMB) receiver, are not shown in FIG. 1, it will be understood by those of ordinary skill in the art that these components may also be included in the portable terminal for their own unique functions.

Hereinafter, the detailed operation of the controller 10 according to an embodiment of the present invention will be described below with reference to FIG. 2.

Figure 2:
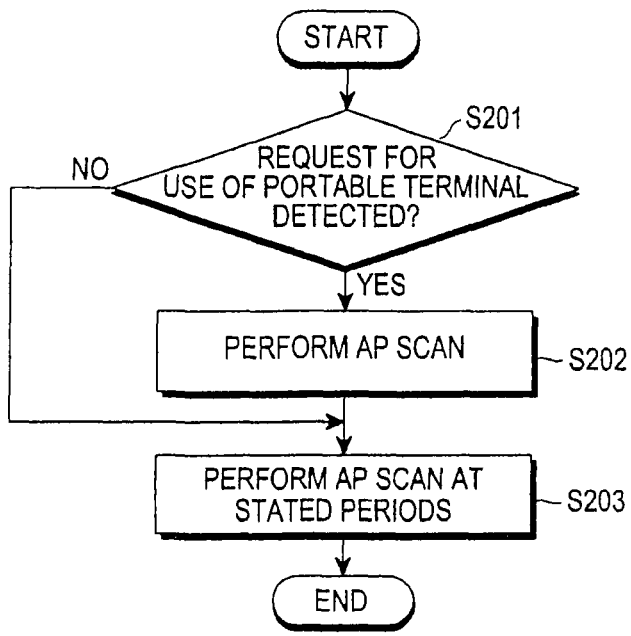
FIG. 2 is a flowchart illustrating a process of scanning APs according to an embodiment of the present invention.
Figure 3:
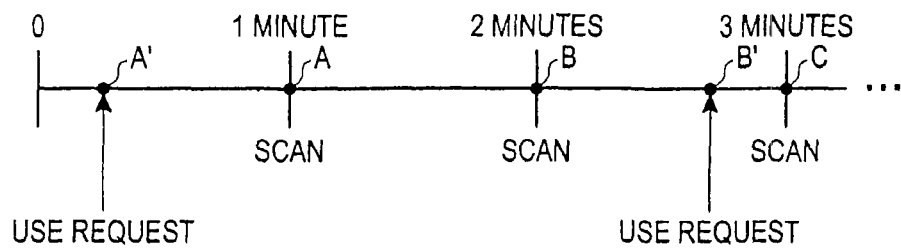
FIG. 3 illustrates a process of scanning APs according to an embodiment of the present invention.

FIG. 2 is a flowchart illustrating a process of scanning APs according to an embodiment of the present invention, and FIG. 3 illustrates a process of scanning APs according to an embodiment of the present invention. An embodiment of the present invention will be described below with reference to FIGS. 1 to 3.

In step S201, the controller 10 determines whether a request for activating the portable terminal for use is detected.

The proposed AP scan approach according to the teachings of the present invention is to immediately scan APs regardless of the scan cycle predetermined by system settings of the portable terminal, upon request for activating the portable terminal.

Therefore, the present invention needs to detect a request for activating the portable terminal. Because the user needs to use the display 50 in order to initiate or activate the portable terminal, it will be assumed herein that requesting to turn on the display 50 of the portable terminal is equivalent to a request for the use of the portable terminal. Alternatively, waking the terminal from a sleep mode or turning on the touch screen to use the terminal will also constitute a request for activating the terminal.

For example, if the user requests activation of the display 50 by inputting a key on the key input unit 27 in order to use the portable terminal, the controller 10 determines that activating (or turning on) the display 50 upon the activation request corresponds to detecting a request for activating the portable terminal.

More specifically, the portable terminal automatically enters the standby mode when it is not used for a predetermined time, or enters the standby mode when a standby mode entry key is input by the user, and the standby mode entry key provides a standby mode release function as well. Therefore, when the user wants to use the portable terminal again, he or she may request an activation of the display 50 by pressing a predetermined key (e.g., the standby mode entry key) again. Therefore, in accordance with an embodiment of the present invention, the controller 10 may determine that activating the display 50 in response to a user request corresponds to detecting a request for activating the portable terminal for use.

If it is determined in step S201 that the request for the use of the portable terminal is detected, the controller 10 scans immediately its surrounding APs in step S202.

Step S202 will be described with reference to FIG. 3. FIG. 3 shows an exemplary case where system settings of the portable terminal are applied to perform AP scan at every single minute. Therefore, the controller 10 scans its surrounding APs at 1-minute scan cycle. Conventionally, AP scan is performed only at points A, B and C having a 1-minute time interval.

However, in accordance with an embodiment of the present invention, if it is determined in step S201 that the request for activating the portable terminal is detected, the controller 10 immediately scans APs at the point where the use request is detected, independently of (or regardless of) the set scan cycle (e.g., 1-minute scan cycle).

For example, assuming that a request for activating the portable terminal is detected at the points A' and B' shown in FIG. 3, the controller 10 may scan APs even at the points A' and B' rather than scanning APs only at the points A, B and C.

In the conventional technology, the controller 10 stores the APs it will preferentially access and their associated information (e.g., encryption keys) used to access these APs, as an AP profile, and automatically accesses an AP based on the stored AP profile.

In accordance with an embodiment of the present invention, therefore, if the controller 10 detects one or more APs at, for example, the point A' or B' by scanning APs upon request for activating the portable terminal, the controller 10 may access the discovered AP based on the stored AP profile and provide wireless communication.

After scanning APs in step S202 upon detecting the request for activating the portable terminal in step S201, the controller 10 also scans APs at a set scan cycles in step S203.

As is already mentioned, the proposed AP scan approach is to immediately scan APs regardless of the scan cycle predetermined by system settings of the portable terminal in response to a request for the use of the portable terminal. Therefore, the controller 10 may continuously scan APs at a set scan cycle, after performing random AP scan upon receiving a request for use the portable terminal (or upon request for the activation of the display 50).

The controller 10 may discover no AP even though it has scanned APs independently of the scan cycle as the display 50 is activated in response to a request to use the portable terminal at, for example, the point A' or B' shown in FIG. 3. Thereafter, if the controller 10 discovers one or more APs by scanning APs at any one of the points A, B and C shown in FIG. 3 at a set scan cycle, the controller 10 may access any one of the discovered APs based on the AP profile.

As is apparent from the foregoing description, the present invention may immediately scan APs rapidly without a delay in response to a request to use the portable terminal from a user while scanning APs at a set scan cycle, thus making it possible to access an AP discovered through the AP scan without a significant increase in power consumption.

The above-described methods according to the present invention can be implemented in hardware, firmware or via the execution of software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for accessing an Access Point (AP) of Wireless LAN system in a mobile phone, comprising:
    scanning for at least one AP of a Wireless LAN at a predetermined interval of time;
    turning off a display of the mobile phone and entering a sleep mode, when the mobile phone has not been used for a predetermined time period and continuing scanning at the predetermined interval of time after entering the sleep mode;
    receiving a user input for turning the display on to wake up from the sleep mode of the mobile phone during the predetermined interval of time;
    responsive to receiving the user input, immediately scanning for at least one AP currently not connected to the mobile phone independent of a point in time at which the user input is received in the predetermined interval of time;
    continuing to scan according to a predetermined interval of time after immediately scanning in response to the receiving the user input for turning the display on;
    based on an AP being found by the scanning, determining whether a found AP is accessible; and
    performing at least one procedure for accessing to the found AP in response to the determination that the found AP is accessible.

2. The method of claim 1, further comprising determining whether the display of the mobile phone has been turned on in response to receiving the user input for turning the display on.

3. The method of claim 1, wherein the predetermined interval of time is set by system settings of the mobile phone.

4. A mobile phone for accessing an Access Point (AP) of Wireless LAN system, comprising:
    an input unit for inputting a request by a user;

a transceiver for scanning for at least one AP of a Wireless LAN at a predetermined interval of time;

a display for outputting display information; and a controller configured to:

turn off the display and enter a sleep mode, when the mobile phone has not been used for a predetermined time period and continue to scan at the predetermined interval of time after entering the sleep mode, receive a user input for turning the display on to wake up from the sleep mode, control the wireless LAN module to immediately scan for at least one AP currently not connected to the mobile phone independent of a point in time at which the user input is received in the predetermined interval of time, in response to receiving the user input for turning the display on, scan according to a predetermined interval of time after immediately scanning in response to the receiving the user input for turning the display on, based on an AP being found by the scan, determine whether a found AP is accessible, and perform at least one procedure for accessing to the found AP in response to the determination that the found AP is accessible.

5. The mobile phone of claim 4, wherein the controller determines whether the display has been turned on in response to receiving the user input for turning the display on.

6. The mobile phone of claim 4, wherein the predetermined interval of time is set by system settings of the mobile phone.

7. The mobile phone of claim 4, wherein the transceiver transmits a probe request signal for finding the at least one AP near the mobile phone in response to the receiving the user input for turning the display on, and in response, receives information needed for connection from the at least one AP.

8. A mobile phone, comprising:

a display; and a controller configured to:

scan for at least one AP of a Wireless LAN at a predetermined interval of time, turn off the display and enter a sleep mode by the mobile phone, when the mobile phone has not been used for a predetermined time period and continue to scan at the predetermined interval of time after entering the sleep mode, receive a user input for turning the display on to wake up from the sleep mode, immediately scan for the at least one AP currently not connected to the mobile phone independent of a point in time at which the user input is received in the predetermined interval of time, in response to receiving the user input for turning the display on, scan according to the predetermined interval of time after immediately scanning in response to the receiving the user input for turning the display on, based on an AP being found by the scan, determine whether a found AP is accessible, and perform at least one procedure for accessing to the found AP in response to the determination that the found AP is accessible.

9. The mobile phone of claim 8, further comprising wireless LAN module for providing a wireless LAN function based on an IEEE 802.11 standard.

10. The mobile phone of claim 9, wherein the wireless LAN module transmits a probe request signal for finding the at least one AP near the mobile phone, and in response, receives information needed for connection from the at least one AP.

11. The mobile phone of claim 8, wherein the predetermined interval of time is set by system settings of the mobile phone.

* * * * *

UNITED STATES PATENT AND TRADEMARK OFFICE
CERTIFICATE OF CORRECTION

Page 1 of 1

PATENT NO. : 10,681,628 B2
APPLICATION NO. : 16/012964
DATED : June 9, 2020
INVENTOR(S) : Yong-Ha Woo et al.

It is certified that error appears in the above-identified patent and that said Letters Patent is hereby corrected as shown below:

In the Claims

Column 6, Claim 1, Line 36 should read as follows:
--...a Wireless LAN system at...--
Column 6, Claim 1, Lines 48-49 should read as follow:
--...phone, a point in time at which the user input is received being independent of the...--
Column 6, Claim 1, Line 52 should read as follows:
--...after the immediate scan in response...--
Column 7, Claim 4, Line 2 should read as follows:
--...LAN system a...--
Column 7, Claim 4, Line 11 should read as follows:
--...the transceiver to immediately...--
Column 7, Claim 4, Lines 13-14 should read as follows:
--...phone a point in time at which the user input is received being independent of the...--
Column 7, Claim 4, Lines 17-18 should read as follows:
--...after the immediate scan in response...--
Column 8, Claim 8, Line 4 should read as follows:
--...LAN system at a...--
Column 8, Claim 8, Lines 14-15 should read as follows:
--...phone, a point in time at which the user input is received being independent of the...--
Column 8, Claim 8, Lines 18-19 should read as follows:
--...after the immediate scan in response...--

Signed and Sealed this
Fourteenth Day of July, 2020

Andrei Iancu
*Director of the United States Patent and Trademark Office*